United States Patent [19]

Knight et al.

[11] E Re. 28,589

[45] Reissued Oct. 28, 1975

[54] XEROGRAPHIC TONER DISPENSER

[75] Inventors: Arthur Holt Knight; Myrl J. Miller, both of Boulder, Colo.

[73] Assignee: International Business Machines Corporation, Armonk, N.Y.

[22] Filed: Aug. 9, 1974

[21] Appl. No.: 495,975

Related U.S. Patent Documents

Reissue of:

[64] Patent No.: 3,572,555
Issued: Mar. 30, 1971
Appl. No.: 828,268
Filed: May 27, 1969

[52] U.S. Cl. ..... 222/148
[51] Int. Cl.[2] ..... B67D 1/08
[58] Field of Search ..... 222/342, 346, 347, 349, 222/350, 148

[56] References Cited

UNITED STATES PATENTS

| | | | |
|---|---|---|---|
| 15,810 | 9/1856 | Kuhns | 222/342 X |
| 686,648 | 11/1901 | Bryan | 222/350 X |
| 2,906,437 | 9/1959 | Wallis | 222/349 X |
| 3,221,938 | 12/1965 | Yonkers | 222/349 X |

*Primary Examiner*—Stanley H. Tollberg
*Attorney, Agent, or Firm*—Laurence R. Letson

[57] ABSTRACT

Apparatus for dispensing toner into a developing unit of a xerographic-copying machine is disclosed. The dispenser comprises a hopper having sidewalls provided by a pair of resilient members whose lower ends engage the periphery of a rotatable fluted-dispensing The resilient members function to seal the lower portion of the hopper, meter the amount of toner carried from the hopper when the fluted-dispensing shaft is rotated, and clean the toner from the toner-carrying grooves or channels of the fluted-dispensing shaft. Mechanism is provided for indicating when the amount of toner in the hopper has been reduced to a predetermined minimum amount.

1 Claim, 6 Drawing Figures

INVENTORS.
ARTHUR H. KNIGHT
MYRL J. MILLER
BY Paul D. Carmichael

XEROGRAPHIC TONER DISPENSER

Matter enclosed in heavy brackets [ ] appears in the original patent but forms no part of this reissue specification; matter printed in italics indicates the additions made by reissue.

---

The present invention relates generally to toner-dispensing apparatus for a xerographic-copying machine. More specifically, the invention is concerned with the provision of a toner dispenser for replenishing the toner in a developer unit of a xerographic-copying machine in a highly reliable and accurately controllable manner.

The xerographic-copying process is well known in the art and employs a photosensitive element comprising a layer of photoconductive material supported on a conductive backing substrate. The process normally includes the steps of depositing a uniform electrical charge on the surface of the photosensitive element while the element is maintained in the dark, exposing the charged element to a light image of the original being copied, and then developing the latent electrostatic image with marking material or toner. If the photosensitive element is to be reused, the toner image is transferred to a sheet of paper or other material defining a copy sheet, usually with the assistance of an external electrical field and/or pressure. Fusing apparatus heats and fixes the toner image on the copy sheet and the finished copy is then transported to an output hopper where it is accessible to the operator. Residual toner is cleaned from the photosensitive element and it is ready for reuse in another copying cycle.

The developing of the latent electrostatic image may be accomplished employing any of a variety of development methods well known to those skilled in the art. The dry development techniques most widely used in xerographic equipment commercially available at the present time are cascade and magnetic brush techniques. In both of these techniques a two component developer composition comprising a mixture of carrier particles and much smaller toner particles is moved into contact with and relative to the photosensitive element. Toner particles are removed from the developer composition and deposited on the latent electrostatic image to develop the same.

It is necessary to replenish the toner which is depleted from the developer composition through normal use and a wide variety of toner-dispensing mechanisms have been proposed for this purpose. The toner usually comprises a pigmented and heat fusable resin which has been ground or otherwise formed to produce a fine powder. This powder can be handled and dispensed employing the general teachings and apparatus used for dispensing fertilizers and other pulverlant materials providing due consideration is given to the small size of the toner particles (an average particle size of about 20 microns), the tendency of the toner to compact and act as a solid when subjected to repeated impact in a confined area, and the tendency of the particles to agglomerate or stick together under conditions of high temperature and humidity. Many of the prior art toner dispensers operate quite successfully in xerographic machines, but have the limitations and disadvantages that the rate at which toner is dispensed varies in accordance with the amount of toner in the hopper, they are sensitive to external vibration which may cause an unregulated and large amount of toner to be released at one time when the copying machine is jarred, the rate at which toner can be dispensed is not controllable to the extent and accuracy desired, and the mechanisms themselves are relatively complicated. The last disadvantage results in relatively high initial manufacturing and maintenance costs.

It is the primary or ultimate object of the invention to provide an improved xerographic toner dispenser which is characterized by its extreme simplicity in construction and operation. The apparatus comprises a hopper having a pair of resilient sidewalls whose lower ends engage a fluted-dispensing shaft forming the bottom wall of the hopper. The apparatus is easily and inexpensively manufactured and operates in a highly reliable manner. The stirring mechanism and cleaning brushes usually associated with toner dispensers may be completely eliminated. Its operation is not adversely affected by vibration and other external disturbances so that the inadvertent discharge of relatively large amounts of toner under these conditions simply does not occur. Improved seals comprising polyurathane foam or similar compressable pads permit the movement and adjustment of the resilient sidewalls, but yet prevent leakage of toner from the hopper.

Another object of the invention is to provide a toner dispenser for a xerographic-copying machine wherein the amount of toner dispensed is accurately and precisely controlled. The fluted-dispensing shaft rotates and the toner-holding grooves or channels therein carry toner to the exterior of the hopper. The resilient sidewalls insure that the same amount of toner fills each of the grooves or channels and that all of the toner carried from the hopper is removed from the grooves and drops into the developer unit. The rate at which the toner is dispensed is accurately regulated by altering the length of time the fluted-dispensing shaft is driven and/or changing its speed of rotation.

A still further object of this invention is to provide a xerographic toner dispenser which includes a means for indicating when the toner in the hopper of the dispenser falls below a predetermined level. This is accomplished by providing a pivoted member that is biased toward a switch-actuating position. The mass of the toner in the hopper maintains the pivoted member in a position wherein the associated switch is not actuated until the toner falls below the predetermined level.

The foregoing and other objects and advantages of the invention will be apparent from the following more particular description of a preferred embodiment of the invention as illustrated in the accompanying drawings.

XEROGRAPHIC COPYING MACHINE

Figure 1:
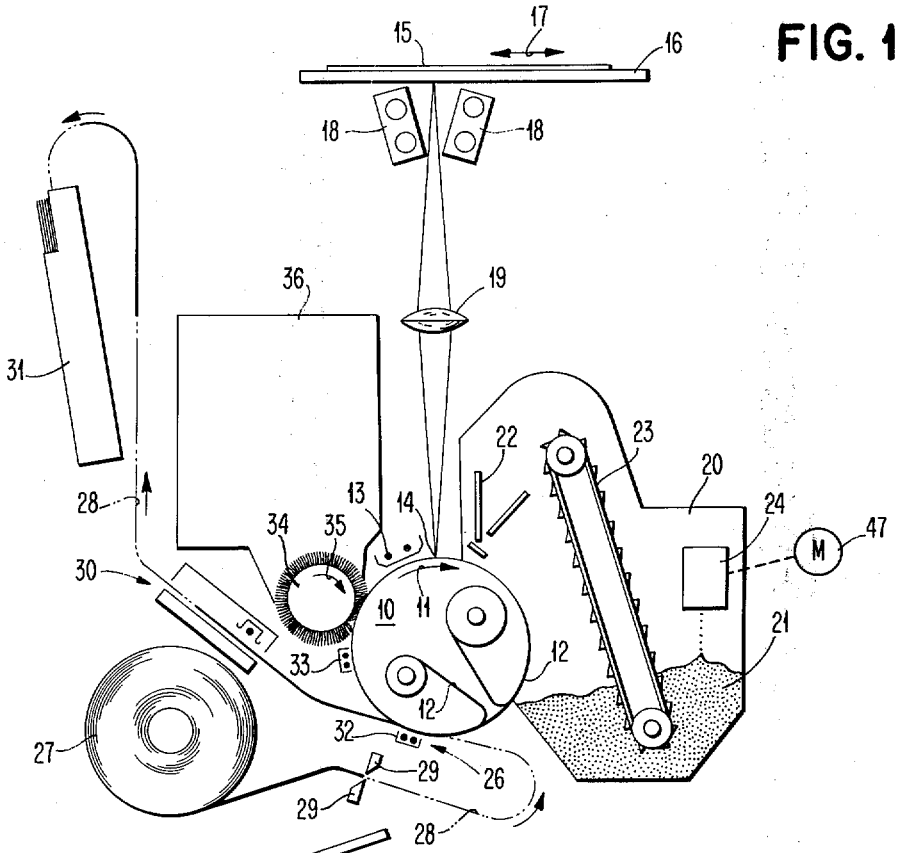
FIG. 1 is a schematic side view of a xerographic copying machine employing toner-dispensing apparatus which is constructed and operated in accordance with the teachings of this invention.
Figure 2:
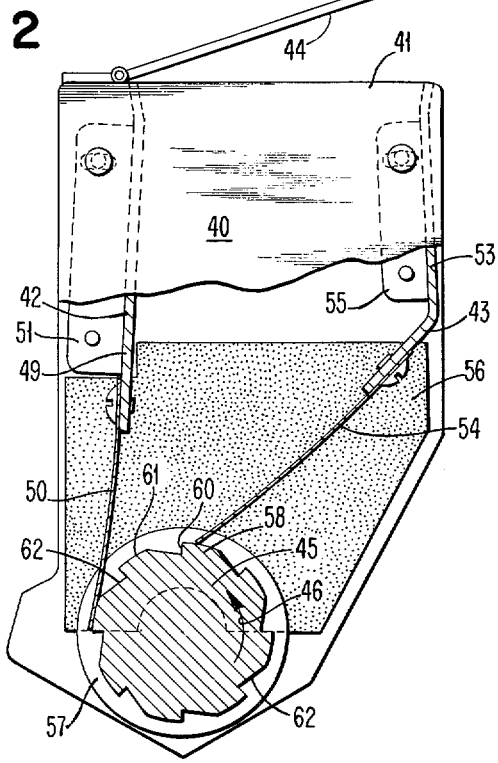
FIG. 2 is an end view, partially in section, of the toner dispenser.

Referring now to the drawings, and initially to FIG. 1 thereof, there is shown a schematic representation of a xerographic-copying machine embodying the toner dispenser of the present invention. The electrophotographic member of the copying machine comprises a drum 10 which is mounted for rotation in the direction indicated by arrow 11. Disposed on the outer periphery of the drum is a thin layer of photosensitive material 12 which is supported on a conductive substrate. The photosensitive material is preferably an organic photoconductor comprising a one-to-one molar ratio of polymerized vinylcarbazole and 2,4,7-trinitro-9-fluorenone which is disclosed and claimed in an application of Meredith D. Shattuck and Ulo Vahtra entitled "Organic Photoconductive Compositions and Their Use in Electrophotographic Processes," Ser. No. 556,982, filed June 13, 1966, which issued on Dec. 16, 1969 as U.S. Pat. No. 3,484,237 and assigned to the assignee of this invention. The photoconductor is coated on a flexible conductive backing material and stored on reels within the interior of the drum to permit replacement or changing of the operative photoconductor surface without removing the drum from the machine as is disclosed and claimed in an application of Clifford E. Herrick, Jr., entitled "Electrophotographic Processes," Ser. No. 649,162, filed June 27, 1967, now abandoned, and assigned to the assignee of the present invention. While the disclosed photoconductor and drum construction are preferred, the present invention is concerned with toner-dispensing apparatus and is not dependent on the use of any particular electrophotographic member.

Disposed about the periphery of the drum 10 are a number of processing stations which carry out the conventional steps of the xerographic-copying process. An initial charging station is provided by a corona unit 13 which deposits a uniform charge on the surface of the photosensitive material while the same is maintained in the dark. The next station is exposure station 14 where a line image of the original document is projected onto the uniformly charged surface of the photosensitive material 12 as the drum rotates. A document 15 to be copied is supported face down on a movable and transparent copy bed 16 which moves back and forth past a scanning slit as indicated by the arrow 17. The document 15 passing the scanning slit is illuminated by lights 18 and a line image of light and shadow is projected by stationary lens 19 onto the photosensitive material 12 carried by the drum.

The next station in the direction of rotation of the drum 10 is a cascade developer unit 20 where a two component developer composition is caused to move across the surface of the drum. The developer composition comprises relatively large carrier particles and much smaller heat fixable marking particles of toner. The developer composition is transported from sump portion 21 of the developer unit to the chute structure 22 by bucket conveyor 23. The developer composition falls or cascades across the surface of the drum and the toner particles are attracted to and deposited on the surface of the photosensitive member in accordance with the latent electrostatic image corresponding to the original. As the toner is used or depleted from the developer composition, it is necessary to replenish the toner. This is accomplished by the toner dispenser 24 which is the subject of this invention and will be hereinafter more fully described. The result of the cascade development operation is the formation of a toner image on the surface of the drum. It is now necessary to transfer the toner image to a copy sheet and this is accomplished at the toner transfer station 26.

The plain copy paper is stored within the copying machine in roll form as indicated by roll 27 and is fed along a path of travel 28 in the direction indicated by the arrows leading past knives 29, toner image transfer station 26, fusing apparatus generally indicated by reference numeral 30 and then to an output copy hopper 31. The copy paper is cut to the length selected by the operator and the cut copy sheet moves into contact with the drum. A transfer corona unit 32 assists in the transfer of the toner image to the copy sheet. The copy sheet is then separated from the drum, the toner image fused by heat and the final copy transported to the output hopper 31.

Not all of the toner image is transferred to the copy sheet and it is necessary to remove the residual toner from the surface of the drum. This is accomplished by employing a preclean corona unit 33 whose corona discharge tends to loosen the remaining toner particles and a cleaning brush 34 which is rotated at high-speed in the direction indicated by arrow 35. The toner particles which are brushed from the surface of the photosensitive material are drawn by vacuum into a filter bag mounted within a housing 36.

The above description of a representative xerographic-copying machine is not intended to limit in any manner the teachings or claims of this invention. The toner dispenser disclosed in this specification can be employed with any of a wide variety of copying machines or systems using various development techniques, such as magnetic brush development.

TONER DISPENSER

The toner dispenser is mounted in fixed relation within the developer unit 20 and is shown in detail in FIGS. 2–6 of the drawings. It comprises an elongated hopper 40 which is adapted to hold an appreciable quantity of the toner. The hopper 40 has a pair of transversely spaced end walls 41, front wall 42, tapering backwall 43, removable top cover 44, and a rotatable fluted-dispensing shaft 45. The dispensing shaft 45 forms the bottom wall of the hopper 40 at the apex of the front and backwalls 42 and 43 and is adapted to be rotated in the direction of arrow 46 by drive motor 47.

The front wall 42 is generally vertical but is tilted slightly inwardly so that toner within the hopper tends to fall away from the front wall and does not collect thereon. The front wall 42 comprises a rigid front 49 and a front resilient member 50. The ends of the plate 49 are flanges 51 that provide a convenient means for attaching the plate to the end walls 41. This attachment is accomplished by bolts and oversize apertures so that the position of the front wall relative to other elements of the dispenser can be easily adjusted. The front resilient member 50 is attached to and extends from the lower end of the front plate 49. Its lower end tangentially engages and resiliently bears against the front edge or surface area of the fluted-dispensing dispensing shaft 45.

The construction of the backwall 43 is generally similar in that it comprises a rigid back plate 53 and a back resilient member 54 attached to and extending from the back plate. End flanges 55, bolts and oversize apertures define a means for attaching the backwall 43 to the end walls 41 as well as a means for adjusting the angle and position of the backwall relative to the fluted-dispensing shaft 45 and the other elements of the toner dispenser. The back resilient member 54 extends in angled relation toward both the front wall 42 and the rotatable fluted-dispensing shaft 45 and its lower end engages the top of the dispensing shaft.

The front and back resilient members 50 and 54 are formed from yieldable and resilient material, such as spring steel. In one constructed embodiment of the invention, the resilient members were rectangular pieces of spring steel 0.012 of an inch thick. However, while the operation of the toner dispenser is dependent on the proper functioning of the resilient members 50 and 54, it should be clearly understood that the invention, in its broader aspects, is not limited to any particular material forming the resilient members. The selection of the resilient material to be used is a matter of design choice taking into account the characteristics of the material being dispensed and the functions performed by the front and back resilient members.

Seals are provided between the ends of the front and back resilient members 50 and 54 and the end walls 41 by pads 56 of polyurathane foam or similar compressable material attached to the end walls. This sealing arrangement prevents the escape of toner and is particularly advantageous since it permits adjusting movement of the front and back walls 42 and 43 without disturbing the toner seals. The polyurathane pads 56 are simply compressed in the areas where they are engaged by the ends of the front and back resilient members.

The end plates 41 each carry a brushing assembly 55 which receives and journals a stub end of the fluted-dispensing shaft 45. Large annular end sealing member 57 are attached to the opposite ends of the main body portion of the dispensing shaft 45 and provide toner seals at the ends of the front and back resilient members. The polyurathane pads 56 and annular sealing members 57 prevent toner from escaping or flowing out of the hopper at the ends of the hopper.

The dispensing shaft 45 is fluted and has a plurality of elongated and circumferentially spaced teeth 58. Between each of the teeth 58 is an elongated dispensing channel or groove 59. The teeth 58 and the dispensing channels 59 alternate about the outer periphery of the dispensing shaft 45 with the radial front edge surface 60 of each tooth forming the backwall of the adjacent dispensing channel 59. The top of the teeth 58 are rounded circumferentially as indicated at 61 while the bottom walls 62 of the dispensing channels 59 are perpendicular to the radially extending front edge surfaces 60.

In operation, the dispensing shaft 45 is rotated at a relatively slow speed by drive motor 47 in the direction indicated by arrow 46. A tooth 58 and a dispensing channel 59 within the interior of the hopper and disposed between the back resilient member 54 and the front resilient member 50 pass through the mass of toner. The dispensing channel 59 is filled with toner and this toner is carried past the front resilient member 50 to the exterior of the hopper. The front resilient member 50 performs a toner metering function in that when it is engaged by the top of the front edge surface 60 of a tooth 58, it is still engaging the rounded surface 61 of the preceding tooth in the direction of rotation of the dispensing shaft and spans or covers the dispensing channel 59. A triangular-shaped chamber of known and predetermined capacity is provided. The walls of the chamber are defined by the front resilient member 50, the bottom wall 62 of the dispensing recess 59, and the front edge wall 60 of the tooth 58. The same amount of toner fills and is carried from the interior of the hopper by each of the dispensing channels 59. The amount of toner dispensed for a given speed of rotation of the dispensing shaft 45 remains constant as long as the hopper is filled with a minimum amount of toner.

The front resilient member 50 also performs a sealing function in that it exerts sufficient force against the teeth 58 of the dispensing shaft 45 to prevent the leakage of toner from the hopper under all operating conditions. However, the general tangential or wiping engagement of the teeth 58 with the resilient member 50 causes the latter to be relatively easily deflected outwardly by the teeth of the dispensing shaft. The spring member 50 moves back and forth as the dispensing shaft is rotated and this oscillating movement assists in maintaining the mass of toner within the hopper 40 in a loose and pulverlant state.

When a dispensing channel 59 rotates past the front spring member 50, the loose toner within the channel will fall to the sump portion 21 of the developer unit 20 for mixing with the developer composition. The channel 59 then rotates past the back resilient member 54 to the interior of the hopper for another charge of toner.

The back resilient member 54 is important to the successful operation of the toner dispenser of this invention and performs the functions of cleaning any toner remaining or sticking in the channels 59, sealing against the leakage of toner from the hopper, and maintaining the toner within the hopper in a state where it is easily dispensed. As the front edge 60 of a tooth 58 engages the lower end of the back resilient member 54, the resilient member is deflected inwardly and upwardly. The lower end of the back resilient member 54 rides up on the rounded surface 61 of the tooth.

Figure 3:
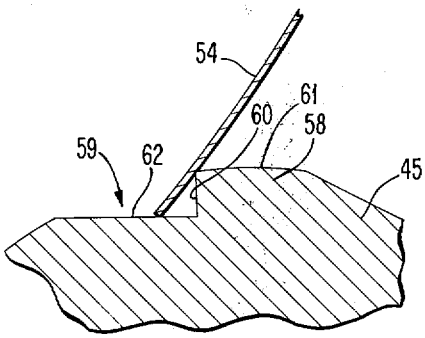
FIG. 3 is an enlarged end sectional view showing specifically the operation of the resilient member in sweeping toner from the channels of the fluted-dispensing member.
Figure 4:
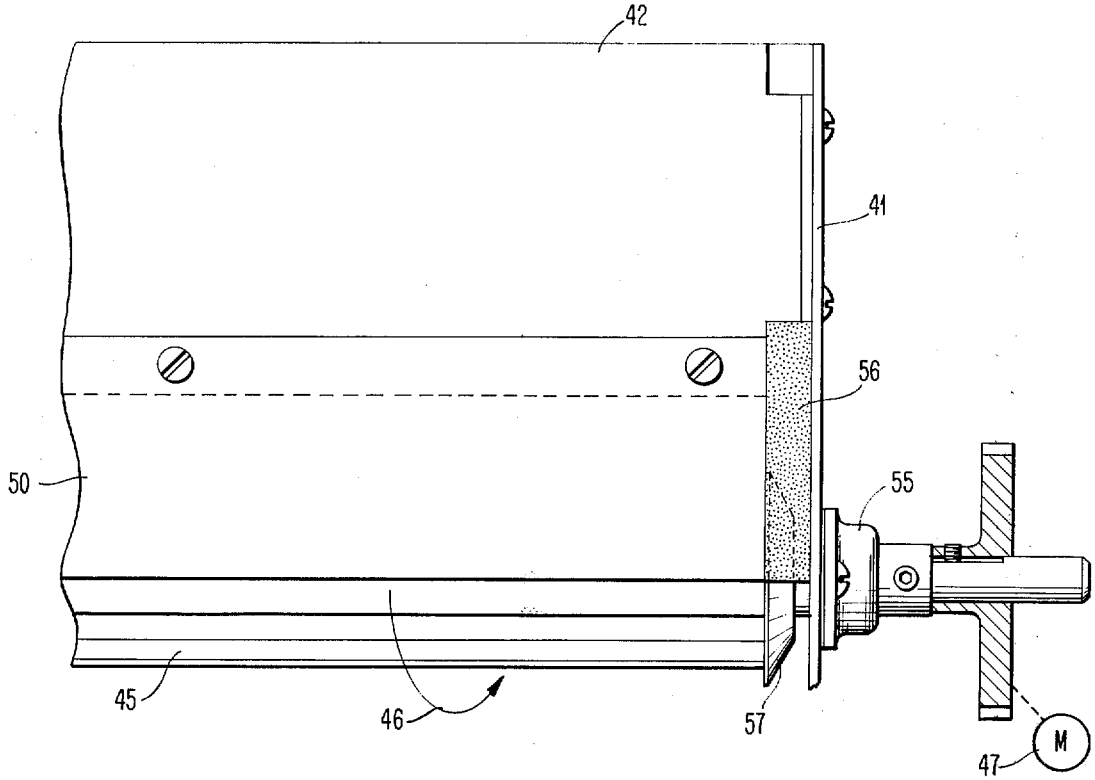
FIG. 4 is a partial side view of the toner dispenser shown in FIG. 2.

Eventually the recess 59 begins to pass beneath the end of deflected back resilient member 54. The resilient member 54 is released and immediately snaps to the rear and slams against the front edge surface 60 of the next tooth 58 as is shown in FIG. 3 of the drawings. The lower edge of the back resilient member wipes the bottom surface 62 of the dispensing recess 58 during its rearward movement. The abrupt or rapid rearward movement of the lower end of the back resilient member 54 cleans or sweeps any remaining toner from the dispensing channel 59. The cleaning of the channels by the back resilient member 54 insures that the same amount of toner is dispensed from the hopper by each of the channels. Without the cleaning action of the back resilient member, the channels may become clogged with toner and this will substantially change or vary the amount of toner dispensed.

In the illustrated embodiment of the invention, each of the dispensing channels 59 is shown to have a right angle corner where the edge surface 60 meets the bottom wall 62. The end of back resilient member 54 does not extend into this corner when the resilient member moves to the rear as is shown in FIG. 3 of the drawings.

However, the entire dispensing channel is cleaned of toner and this is apparently due to the air turbulence generated by the rearward movement of the resilient member 54. It should be clearly understood that it is within the scope of the present invention to employ a different shape or profile for the teeth of the fluted-dispensing shaft. For example, the front edge walls 60 can be sloped forwardly so that the space existing between the back resilient member 54 and the front wall under the conditions depicted in FIG. 3 would be completely eliminated.

The back resilient member 54 also performs a sealing function in that sufficient spring pressure is exerted to prevent the leakage of toner from the hopper. Also, the back and forth movement of the resilient member 54 assists in maintaining the mass of toner within the hopper in a free flowing condition.

The combined action of the resilient members 50 and 54 is such that the stirring mechanisms usually associated with prior art toner dispensers for maintaining the toner mass within the dispensing hopper in condition for dispensing have been found unnecessary in toner dispensers constructed in accordance with the teachings of this invention. The need for additional means to clean toner from the dispensing channels, such as an elongated rotating brush, has not been found necessary. However, these mechanisms can easily be incorporated into the disclosed toner dispenser if they are found desirable.

The rate at which the toner is dispensed from the hopper 40 is controlled by rotating the fluted-dispensing shaft 45 at a constant speed and regulating the length of time the motor 47 is energized. Alternately, the speed of rotation of the dispensing shaft 45 can be varied by changing the speed of motor 47 or changing the setting of change-speed mechanism interconnecting the motor 47 and the dispensing shaft 45. The toner dispenser is well adapted for use in a feedback system wherein the construction of the toner in the developer composition in the developer unit is monitored and output signals are provided for controlling the operation of the toner dispenser and the rate at which toner is dispensed.

Figure 6:
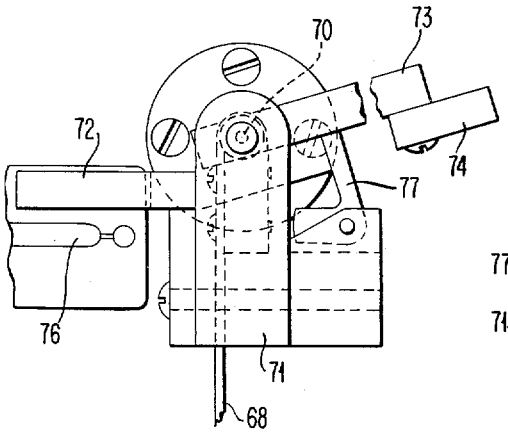
FIG. 6 is a partial side view of the apparatus shown in FIG. 5.
Figure 5:
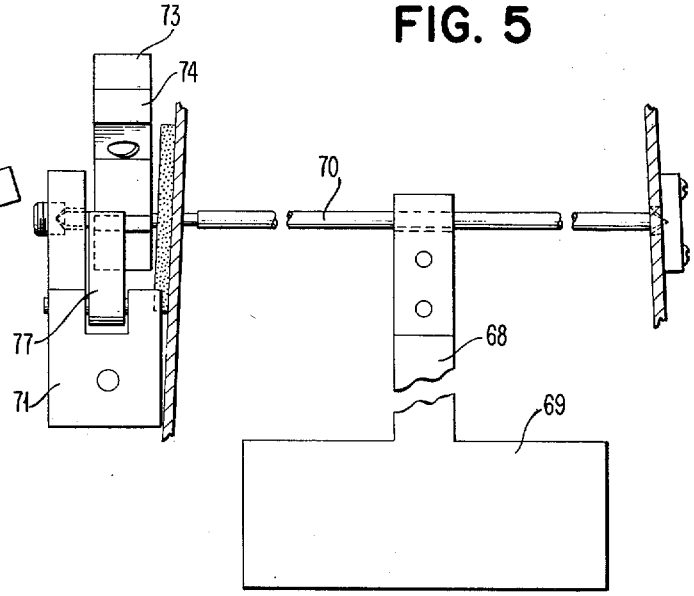
FIG. 5 is an end sectional view depicting specifically the construction of the mechanism for detecting when the amount of toner in the hopper has been reduced to a predetermined amount.

The apparatus for indicating when the toner within the hopper has fallen below a predetermined level is shown in FIGS. 5 and 6 of the drawings. A paddle 68 is located between the sidewalls 42 and 43 of the hopper 40 and is positioned so its enlarged lower end or blade 69 is disposed slightly above the dispensing shaft 45. The paddle 68 is rigidly attached to pivot pin 70 which extends from backwall 43 through the front wall 42 to mounting bracket 71. Rigidly attached to the pivot pin 70 adjacent mounting bracket 71 are a magnetic switch actuator 72 and a lever 73 holding counterweight 74. The counterweight 74 tends to bias or pivot the paddle 68 so that in the absence of toner the same rotates and switch actuator 72 is moved to actuate reed switch 76. The paddle 68 is normally maintained in its vertical position against the biasing force exerted by counterweight 74 by the mass of the toner within the hopper which surrounds the blade 69. The paddle 68 pivots to actuate the switch 76 when the level of the toner in the hopper falls below a predetermined level. A latch 77 is provided to hold the paddle 68 in a vertical position when the hopper is being filled with toner. This latch is pivoted out of the way by the operator when the toner hopper has been filled.

The use of the apparatus for detecting when the toner in the hopper falls below a predetermined level in the toner dispenser of this invention is particularly advantageous. The oscillating front and back resilient members prevent voids or holes from forming in the mass of toner and insure the level of the toner is the same at all points along the length of the hopper. The presence of holes or voids could cause uneven filling of the dispensing channels. The paddle detector provides an output signal indicating when additional toner is required as the mass of toner approaches a level where there is insufficient toner remaining in the hopper to completely fill the dispensing channels.

While the invention has been particularly shown and described with reference to a preferred embodiment thereof, it will be understood by those skilled in the art that changes in form and details may be made therein without departing from the spirit and scope of the invention.

We claim:

1. A toner dispenser for disposing metered quantities of toner to a developing unit in a copying machine comprising:

a toner receiving hopper having a pair of sidewalls;

means to detect when the toner in said hopper falls below a predetermined level;

said means to detect comprising a measuring member extending into said toner within said hopper;

biasing means tending to move said measuring member from a normal position to an actuated position;

said toner in said hopper surrounding said measuring member maintaining said measuring member in [actuated] *said normal* position against the action of said biasing means;

a dispensing shaft forming a portion of at least one wall of said hopper;

a plurality of teeth and toner-carrying dispensing channels disposed alternately about the periphery and extending the length of said dispensing shaft;

one of said sidewalls comprising a platelike deflectable back resilient member having an end portion coextensive with said teeth and toner-carrying dispensing channels and engaging said periphery of said dispensing shaft to provide a toner seal and a cleaning means for removing toner remaining in said toner-carrying dispensing channels; and means to rotate said dispensing shaft whereby quantities of toner are metered to said developer unit.

* * * * *